US012195936B2

(12) United States Patent
Bassfeld et al.

(10) Patent No.: US 12,195,936 B2
(45) Date of Patent: *Jan. 14, 2025

(54) HIGH-SPEED SYSTEM FOR WEED CONTROL

(71) Applicant: Discovery Purchaser Corporation, Wilmington, DE (US)

(72) Inventors: Hinnerk Bassfeld, Lienen (DE); Thomas Arians, Rommerskirchen (DE); Nils Keilholz, Werdohl (DE)

(73) Assignee: Discovery Purchaser Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/931,392

(22) Filed: Sep. 12, 2022

(65) Prior Publication Data

US 2023/0002986 A1 Jan. 5, 2023

Related U.S. Application Data

(63) Continuation of application No. 16/607,620, filed as application No. PCT/EP2018/060459 on Apr. 24, 2018, now Pat. No. 11,473,256.

(30) Foreign Application Priority Data

Apr. 28, 2017 (EP) .................................... 17168844
May 23, 2017 (EP) .................................... 17172539

(51) Int. Cl.
*E01H 11/00* (2006.01)
*B05B 1/16* (2006.01)
(Continued)

(52) U.S. Cl.
CPC ................ *E01H 11/00* (2013.01); *B05B 1/16* (2013.01); *B05B 1/169* (2013.01); *B05B 1/20* (2013.01);
(Continued)

(58) Field of Classification Search
CPC ........... E01H 11/00; B05B 1/16; B05B 1/169; B05B 1/20; B05B 12/02; B05B 12/122;
(Continued)

(56) References Cited

U.S. PATENT DOCUMENTS 722,494 A * 3/1903 Copp ........................ E05G 1/12
3,101,902 A 8/1963 Cyril et al.
5,381,958 A 1/1995 Guenther et al.

FOREIGN PATENT DOCUMENTS

CN 1633536 A 6/2005
CN 1945601 A 4/2007
(Continued)

OTHER PUBLICATIONS

Japanese Notification of Reason for Rejection mailed Jan. 4, 2022 for Japanese Patent Application No. J019-558616 with English translation (4 pages).

*Primary Examiner* — Darren W Gorman
(74) *Attorney, Agent, or Firm* — McBee Moore & Vanik IP, LLC

(57) ABSTRACT

The invention relates to a modular system for weed control for a rail vehicle. The modular system has a control unit for producing control signals for controlling valves and miners in a separate herbicide and mixing module and for producing a second set of control signals for controlling valves of a nozzle rod. The herbicide and mixing module has a container for holding different herbicides and electrical connection elements for connections to the control unit. Furthermore, a nozzle rod is present, which is fitted with a nozzle set, in order to spray herbicides of the herbicide and mixing module. In addition, a camera module is present, which produces a weed signal in response to the detection of a weed, in order to control the spraying of the herbicides. The camera module is at such a distance from the nozzle rod that,
(Continued)

despite high speed, there is sufficient time to provide the herbicide at the nozzles.

10 Claims, 9 Drawing Sheets

(51) Int. Cl.

| | |
|---|---|
| ***B05B 1/20*** | (2006.01) |
| ***B05B 7/04*** | (2006.01) |
| ***B05B 12/00*** | (2018.01) |
| ***B05B 12/02*** | (2006.01) |
| ***B05B 12/12*** | (2006.01) |
| ***B05B 12/16*** | (2018.01) |
| ***B05B 13/00*** | (2006.01) |
| ***B61D 15/00*** | (2006.01) |

(52) U.S. Cl.
CPC .......... *B05B 7/0408* (2013.01); *B05B 12/004* (2013.01); *B05B 12/02* (2013.01); *B05B 12/122* (2013.01); *B05B 12/124* (2013.01); *B05B 12/16* (2018.02); *B05B 13/005* (2013.01); *B61D 15/00* (2013.01)

(58) Field of Classification Search
CPC ....... B05B 12/124; B05B 12/16; B05B 12/18; B05B 13/005; B61D 15/00
See application file for complete search history.

(56) References Cited

FOREIGN PATENT DOCUMENTS

| | | | | | |
|---|---|---|---|---|---|
| DE | 4132637 | A1 | | 4/1993 | |
| DE | 102017004257 | A1 | * | 11/2018 | ............ A01M 21/04 |
| EP | 2728068 | A1 | | 5/2014 | |
| EP | 3358525 | A1 | | 8/2018 | |
| JP | S51-078880 | U | | 6/1976 | |
| JP | 2006142999 | A | | 6/2006 | |
| NL | 8800868 | A | | 11/1989 | |
| WO | 2004005625 | A1 | | 1/2004 | |

* cited by examiner

HIGH-SPEED SYSTEM FOR WEED CONTROL

CROSS REFERENCE TO RELATED APPLICATIONS

This application is a continuation of U.S. application Ser. No. 16/607,620, filed Oct. 13, 2019, which is the U.S. National Stage Application of International Application No. PCT/EP2018/060459, filed Apr. 24, 2018, which claims priority to European Patent Application No. 17168844.3, filed 28 Apr. 2017 and European Patent Application No. 17172539.3, filed May 23, 2017, the entire contents of each of which are hereby incorporated by reference.

FIELD OF THE DISCLOSURE

The invention relates to a modular system for weed control for a rail vehicle, and in particular to a weed control system in trackbeds which remains usable even at high speeds, a spraying train, and a method for controlling weeds in a trackbed.

BACKGROUND OF THE DISCLOSURE

A known task which operators of rail systems constantly face is clearing the tracks of unwanted vegetation, especially weeds. It is known to make a distinction between preventive measures for weed control and measures that are initiated when the weeds have already grown. Although rail-bound systems are known which use a technology based on a camera system specifically to combat weeds, the known railway vehicles that are equipped with appropriate equipment for weed control are significantly limited in the speed at which the weed control can be accomplished. A use of these known rail vehicles for weed control usually requires slow service journeys, as weed recognition requires corresponding long computation times or is inflexible with regard to the weeds.

SUMMARY OF THE DISCLOSURE

The object addressed by the present invention is, therefore, a design for a system for weed control, which is flexible with regard to the control unit used, the camera and the train speeds and can be used at relatively high travel speeds.

The above object is achieved by means of the subject matter of the independent claims. Advantageous embodiments of the invention are derived from the dependent claims, the following description and the figures.

A first object of the present invention is therefore a modular system for a rail vehicle for weed control, comprising a control and monitoring module, a herbicide and mixing module, a nozzle rod, and a camera module;

wherein the control and monitoring module, the herbicide and mixing module and the nozzle rod can each be individually reversibly fixed to a support element;

wherein the control and monitoring module comprises a control unit, the control unit being configured to generate a first set of control signals for controlling valves and mixers in the herbicide and mixing module for mixing a herbicide mixture, and the production of a second set of control signals for controlling valves of the nozzle rod;

the herbicide and mixing module comprising:

valves and mixers, a container for holding different herbicides, which are selectively fluidically connected to the valves and mixers in a selective fluidic connection, connection elements, via which electrical signal connections can be made to connection elements of the control unit, so that the first control signals generated in the control unit can be directed to the valves and mixers of the herbicide and mixing module;

wherein the camera module has a predefined distance to the nozzle rod, has a predefined distance to the control unit, is spatially separated from each of the control unit, the herbicide and mixing module and the nozzle rod, is positioned in front of the control unit, the herbicide and mixing module and the nozzle rod in a amnion direction of motion thereof, and is configured to generate a weed signal in response to detection of a weed;

and wherein the generation of the first set of control signals and the generation of the second set of control signals by the weed signal of the camera module can be controlled by means of the control unit.

A further object of the present invention is a spraying train for weed control on railway tracks, comprising the modular system according to the invention on one or more carrying wagons, and a second wagon for reversibly receiving the camera module, the second wagon being arranged in front of the one or more wagons in a direction of travel.

A further object of the present invention is a method for controlling weeds in a trackbed, comprising the steps of:

reversibly securing a control and monitoring module comprising a control unit to a carrying wagon, reversibly securing a herbicide and mixing module to the carrying wagon, reversibly securing a nozzle rod to the carrying wagon, the nozzle rod being spatially independent of both the control and monitoring module and the herbicide and mixing module, producing a fluidic connection between the herbicide and mixing module and the nozzle rod, generating a weed signal using a camera module, which is spaced in front of the carrying wagon in a travel direction of the carrying wagon, manipulating a first set of control signals for controlling valves and mixers in the herbicide and mixing module for mixing a herbicide mixture by means of the control unit as a function of the weed signal of the camera module, manipulating a second set of control signals for controlling valves of a nozzle rod by means of the control unit as a function of the weed signal of the camera module, and selective spraying of the herbicide mixture onto rail tracks through nozzles in the nozzle rod.

DETAILED DESCRIPTION

Figure 1:
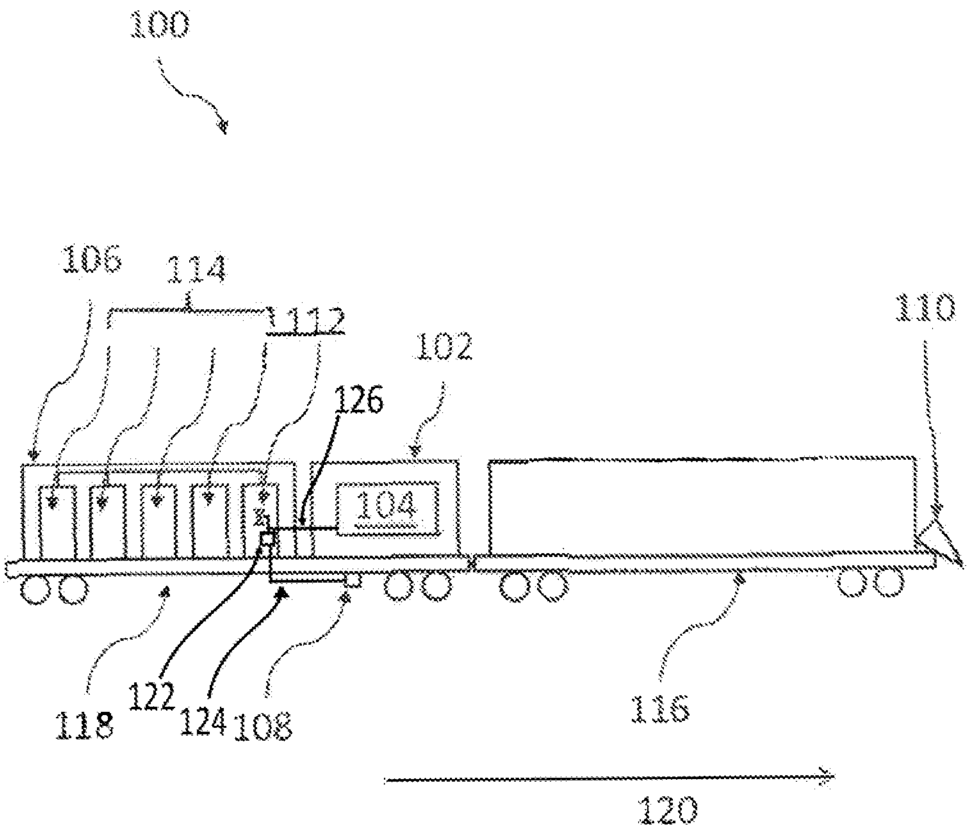
FIG. 1 shows the modular system for weed control for a rail vehicle, according to some embodiments.

The invention is explained in more detail below, without distinguishing between the invention objects (modular system, spraying train, method). The following explanations are intended instead to apply to all objects of the invention in an analogous manner, regardless the context in which they are given (modular system, spraying train, method).

If steps are listed in a chronological order in the description of the method according to the invention, this does not necessarily mean that the steps must also be carried out in the order given. The invention is instead to be understood such that the steps listed in a sequence can be executed in any desired order or else in parallel with each other, unless a step is based on another step, which should be clear from the description of the steps in each case. The specific order listed in this document therefore constitutes only a preferred embodiment of the invention.

According to a first aspect of the present invention, a modular system for weed control for a rail vehicle is presented. The modular system has a control unit, a herbicide and mixing module, a nozzle rod and a camera module.

The control unit is configured for generating a first set of control signals for controlling valves and mixers in a separate herbicide and mixing module for mixing a herbicide mixture, and for generating a second set of control signals for controlling valves of a nozzle rod.

The herbicide and mixing module has a container for holding different herbicides, which are selectively fluidically connected to the valves and mixers in a selective fluidic connection, and connecting dements via which electrical signal connections to connection dements of the control unit can be produced in the control unit, so that the first control signals generated can be directed to the valves and mixers of the herbicide and mixing module.

The nozzle rod, which in each case is spatially independent of both the control unit and the herbicide and mixing module, has a first set of nozzles for spraying herbicides and a fluid connection to a selection of the valves and mixers of the herbicide and mixing module.

The camera module generates a weed signal in response to the detection of a weed. In doing so the generation of the first set of control signals and the generation of the second set of control signals by the weed signal of the camera module can be controlled by means of the control unit.

The camera module itself is located at a predefined distance from the nozzle rod, is spatially separated from the control and monitoring module, the herbicide and mixing module and the nozzle rod and arranged in front of these in a common direction of motion.

According to a second aspect of the present invention, a spraying train for weed control for a rail vehicle is presented. The spraying train comprises the said modular system for weed control on one or more carrying wagons, and a second wagon for reversibly holding the camera module. The second wagon is arranged in front of the one or more carrying wagons in a direction of travel.

According to a third aspect of the present invention, a method for controlling weeds in a trackbed is presented. The method comprises the following, in particular: reversibly securing a control unit in a control and monitoring module to a carrying wagon, reversibly securing a herbicide and mixing module to the carrying wagon, reversibly securing a nozzle rod to the carrying wagon, the nozzle rod being spatially independent of both the control and monitoring module and the herbicide and mixing module.

The method further comprises producing a fluidic connection between the herbicide and mixing module and the nozzle rod, and generating a weed signal using a camera module, which is arranged a distance in front of the wagon in a direction of travel of the carrying wagon.

The control unit of the control and monitoring module manipulates a first set of control signals for controlling valves and mixers in the herbicide and mixing module for mixing a herbicide mixture. This manipulation is dependent on the weed signal from the camera module.

The method further comprises manipulating a second set of control signals for controlling valves of a nozzle rod by means of the control unit of the control and monitoring module as a function of the weed signal of the camera module, and a selective spraying of the herbicide mixture through nozzles of the nozzle rod onto railway tracks.

The following terms, expressions and definitions are used in this document:

The term “modular system”, in the context of the spray train presented, describes the fact that different modules are available from which a weed control for trackbeds can be assembled. The individual modules used are—in particular in the case of transport—independent of each other. They can be assembled at a destination—i.e., at the deployment site for weed control—into an operative overall system for weed control on railway tracks.

The term “weed control” describes the process for spreading herbicides, in order to selectively combat existing weeds. In addition, in the context of this description weed control is to be understood to include proactive measures; i.e., such measures as are used to prevent weeds occurring in the first place.

The term “rail vehicle” here describes a wagon and/or a drive car for railway transport. A rail vehicle normally has at least two axles, each with two wheels which can be mounted on two rails running parallel to each other. The two axles can usually be connected to a chassis, on which appropriate structures (e.g. for holding goods or persons to be transported) can be mounted.

The term “control unit” here refers to a unit which is configured to process input signals and to generate output signals depending on the input signals. The input signals can have different sources, such as the speed of movement of the control unit relative to the ground, or else output signals of the camera module. For example, if the camera module generates image data, for example, which are assigned by the control unit to specific weeds, the control unit can also generate output signals in order to provide weed-specific herbicide mixtures by means of the valves and mixers which are individually controllable via the output signals of the control unit. Using a further set of output signals which are directed by the control unit to the nozzles—potentially also mixers and valves—of the nozzle rod, herbicide mixtures can be sprayed in the trackbed and the associated embankment. The control unit is part of the control and monitoring module, which can be reversibly attached to the carrying wagon.

In addition, nozzles of the nozzle rod can also be provided for spraying a path running at the side of the embankment.

The term "control and monitoring module" is a self-contained module, which can be understood as a central control module of the modular system presented, for weed control for a rail vehicle. In the control and monitoring module, essentially all control signals are generated or processed by means of the control unit in order to ensure the overall function of the modular system for weed control for a rail vehicle. In addition, the control unit can also be used for manual interventions in the herbicide emission through the nozzle rod via a control panel, which can be a functional part of the control unit.

The term "spatially independent" here means that a module or component is not physically connected to another component in any way. In fact, it can be positioned independently of the other components in an overall system. For example, the nozzle rod can be attached separately to the carrying wagon independently of the control and monitoring module and also independently of the herbicide and mixing module. Another example relates to the camera module. It can be positioned independently of the other components or modules. For example, it can be mounted on the preceding tank car or it can be attached to a drone. Nevertheless, it can have a predefined distance from one of the other modules—for example, the nozzle rod—at any time.

The term "control signal" describes an electrical signal which is generated by a controller and controls an activator—for example in the form of a valve or nozzle—in its operation. In addition, it is also a signal on a data line from the camera module to the control unit, which signals to the control unit that a weed in general or a particular (specific) weed has been detected.

The term "herbicide and mixing module" describes another module of the modular system for weed control for a rail vehicle. The herbicide and mixing module has a plurality of container which can hold different herbicides. In addition, a plurality of valves and mixers is present, so that different herbicide mixtures, preferably weed-specific herbicide mixtures, can be produced on site. The herbicide and mixing module can additionally have different connectors: a water connection and a plurality of electrical cables for controlling and monitoring the function of the herbicide and mixing module. Moreover, additional lines can be present to refill one or more of the containers with appropriate herbicides. Furthermore, a connector for a supply line to a nozzle rod can be present.

The term "nozzle rod" describes a carrier frame on which a plurality of nozzles for spreading the herbicide mixtures is present. The nozzle rod is a further module of the modular system for weed control for a rail vehicle. The nozzle rod also has a plurality of preferably electrical and/or pneumatic connections, via which the function of the individual nozzles can be controlled. In addition, the nozzle rod can have one or more connections for supply lines of the herbicide mixtures and/or water and/or compressed air. The nozzle rod can be reversibly secured to the carrier element or the carrying wagon.

The term "selective fluidic connection" describes a connection between a source and a sink for a gas or a liquid. The selectivity of the fluidic connection indicates that the intensity of the connection—i.e., the cross-section of the connection or the flow velocity and thus the amount of material transported by the fluidic connection, can be selectively controlled. Typically, this controlling influence can be carried out using one or more valves.

The tenth "support element" describes a common base for the modules of the modular system for weed control for a rail vehicle. It is not necessary for all modules to be mounted on—i.e. on top of—the support element. They can also be reversibly connectable to the support element at the side of or underneath it.

The term "in a container design" is directly related to the modular design of the modular system presented here. All or some of the modules of the modular system can each be integrated in a standard container—e.g. a standard 20-foot container. Standard containers are preferably understood to mean those containers described in the ISO standard 661: 2013-08. Of course, other container sizes are also possible. The term "container design" is also intended to capture such modules as can be integrated in a standard container, to be able to transport the module, for example, integrated in such a standard container with commonly used means (for example, truck, aircraft or ships configured for the transport of standard containers). For example, it is conceivable that one or more modules have a platform (base plate) which has the same dimensions as the platform of a standard container, and side walls and a roof panel can be installed on the platform and/or the side walls so that the module can be enclosed and the enclosed module constitutes a standard container. The advantage of the container construction is in the fact that, among other things, different modules can be incorporated into a respective container. This applies, for example, to the control and monitoring module, the herbicide and mixing module or else to a lounge or storage module.

A "camera" module has at least one electronic camera and an evaluation electronics. The camera module typically has much smaller dimensions than the previously described container-sized modules of the modular system for weed control. The camera module can be connected via electrical connections to the control unit of the control and monitoring module for data exchange purposes. The camera module can either transmit raw data directly to the control unit, or a pre-processing of the image data recorded by the camera can take place within the camera. In both cases, the camera of the camera module can be directed at the trackbed of the section of railway track located in front of it. To ensure the processing of the data of the camera module and to make the necessary herbicides ready for use at the nozzles of the nozzle rod—for example, to transport them there by means of the fluid connections—the camera module can be provided significantly in front of the nozzle rod.

In addition, the camera system can have a plurality of individual cameras, which are either assigned to trackbed segments, for example, and/or generate weed-specific data and signals. The image data of the cameras can also be correlated with each other in order to recognize weeds in general or more specifically.

The term "weed signal" can describe one or more electrical signals, which by their specific nature indicate the presence of weed/weeds. Based on one of these weed signals, herbicides or herbicide mixtures can be provided for weed control. In particular, the weed signal can also be a weed-specific weed signal, which signals a recognition of specific weeds.

The term "weed-specific weed signal" can describe one or more electrical signals, which by their specific nature indicate the presence of a particular weed species. Based on one of these weed-specific weed signals, weed-specific herbicides and/or herbicide mixtures can be provided for eliminating the particular weed species.

The term "weed-specific herbicide" or "weed-specific herbicide mixtures" describes a means with which specific weeds are controlled.

The term "power module" describes a further module of the modular system for weed control. The power module can exist in a container construction. Alternatively, an enclosure can protect, for example, a generator for producing electricity against external influences. This enclosure can be mounted on a platform in addition to other elements, which in turn represents a base platform of a standard container.

The term "carrying wagon" in the context of the design presented here describes a freight wagon in the form of a flat wagon, which has a support frame, but no other fixed structures. The axles are typically mounted on bogies.

The term "lounge module" describes a further optional module of the modular system for weed control. This module can also be embodied in a container design. Facilities can be provided in it for people to stay—for example, to rest or for work purposes.

The term "closure rail nozzle" in the context of this document designates a nozzle, which is located on the nozzle rod in an area above and between the rails. Such a nozzle can essentially spray the trackbed between the individual sections of railway track. On the other hand, the term "embankment nozzle" describes a nozzle which is located on the nozzle rod above or beside the embankment of the trackbed and is configured to spray the embankment of the trackbed in use.

A distinction is made here between "half-jet nozzles" and "full-jet nozzles". A full-jet nozzle produces a spray jet, which propagates symmetrically in relation to an axis aligned vertically to the nozzle direction. In contrast, the spray jet of a half-jet nozzle is asymmetrical to the axis aligned vertically to the nozzle direction, so that, for example, a spray jet is created on only one side of the vertically aligned axis. This can be achieved by a special shaping of the nozzle or by shielding plates. Regardless of this, the nozzles are designed as spoon nozzles. In these nozzles a spoon-shaped shield screens the spray jet as it emerges from the nozzle, for example against the airstream of the spraying train.

The concept presented here of the modular system for weed control for a rail vehicle has a number of advantages and technical effects, which apply in comparable ways to the spraying train or the corresponding method:

On the one hand, the modular design of the presented system results in flexible deployment options with regard to location and time. The individual modules can be detached from the carrying wagon at any time, in order then to be transported to another location by air freight, for example. Once arrived at the destination, the presented system can be mounted on a new carrying wagon so that a weed control can now be performed at this destination.

On the other hand, the modular system is designed for controlling weeds at high train speeds. In known systems, a camera module is always provided in the immediate vicinity of—or at least on the same car as—the control unit. The required computing time—either in the camera module or in the control unit—for recognizing any or certain (specific) weeds is relatively high, so that at relatively high train speeds the nozzle rod for delivering the herbicides has already passed the detected weed and a herbicide delivery would thus take place too late. By positioning the camera or camera module far in front of the control unit or the nozzle rod, in accordance with the equation "available time equals the distance between the nozzle rod and the camera module divided by the speed", the crucial amount of time for identifying the weed or for providing the herbicidal mixture at the nozzles is provided. Thus, the further the camera module is positioned in front of the herbicide-delivering nozzle rod, the faster the train can travel.

Consequently, a section of track to be prepared with herbicides is cleared for general train travel again much more quickly. This has both technical (timetable) and economic benefits for the track operator.

To achieve this, it is not even necessary for the camera module to be mounted directly on another car of the train. Rather, the camera module can also be mounted on a preceding train, which is preferably traveling at a constant distance in front of the train with the nozzle rod. In this case, the data of the camera module can be transmitted wirelessly to the control unit. An essential feature is that even in this case, a real-time processing of the camera data can be performed to calculate the correct times for delivering the herbicides by the nozzle rod. It is thus not necessary to generate an elaborate map (weed map) with the locations of the weeds from the camera data.

In addition, it is also possible to use a drone, which carries the camera module and preferably flies at a constant distance in front of the train or the nozzle rod. Also in this case, the camera data would be transmitted wirelessly to the control unit; and in this case also, a real-time processing of the camera data is carried out without the need for a weed map.

The proposed design thus allows a much higher degree of flexibility with regard to the usable computation speed of the control unit used, which can be lower and thus also less expensive, and with regard to the speed at which the spraying train can travel.

In the following, further exemplary embodiments of the modular system will be presented, which can be applied mutatis mutandis both to the spraying train and accordingly to the method presented.

The control and monitoring module can hold further components in addition to the control unit. These can include workstations for operating personnel, and monitors and other monitoring equipment or else receivers of weather data or data from geographical information systems.

The support element can be a carrying wagon for use on rails. A carrying wagon can be a quasi-standardized car of a train for holding loads—such as container-like modules.

The camera module can be reversibly attached to a vehicle traveling ahead of the control unit. The car which is coupled in front of the car that carries the nozzle rod in the direction of travel can be, for example, a tank car, which is suitable for holding mixing water, which can be provided to the herbicide and mixing module via a hose line. The wagon traveling ahead can also refer to the locomotive pulling the carrying wagon, however, on which the control and monitoring module with the control unit is reversibly secured. In this case the distance between the camera module and the control unit is secured in each case or known at all times.

Furthermore, the camera module can be mounted on a—potentially autonomously operating—drone or a multicopter. Such an unmanned flying object can fly at a fixed or temporarily known distance from the control unit/the nozzle rod in front of the spraying train. The platform of the power module can be used as a launching and landing pad. In order not to have to stop the spraying train if the flight object threatens to run out of fuel, a second flying object with a second camera module can be used, which can perform the task of the flying object to be refueled with a quasi "on-the-fly exchange". The flying object can be operated electrically or also have a fuel-powered motor. The distance from the flying object to the control unit or to the nozzle rod can be determined and adjusted via a GPS navigation. Appropriate methods are well known. This variant also does not presuppose a weed map. Instead, the data of the camera module can be converted directly into a delivery of herbicides via the nozzle rod.

The camera module may also be mounted on a train which is traveling in front of the spraying train that carries the control unit and the nozzle rod. Preferably, the preceding train maintains a constant distance from the spraying train. This means that the time available for the calculation whether to combat a weed with herbicides is constant. Alternatively, the preceding train can have a time-varying distance from the spraying train. Such speed differences and thus variable distances can be allowed for in the time calculation for the delivery of the herbicides via the nozzle rod by the control unit.

The camera module can also be adapted to generate a weed-specific weed signal. The control unit can be adapted to receive the weed-specific weed signal from the camera module. In addition, the control unit can be adapted to generate the first set of control signals for controlling the valves and mixers of the herbicide and mixing module.

In addition, the nozzle rod can have one group of closure rail nozzles and two groups of embankment nozzles. Each of these groups should have at least one nozzle. Within the groups, it is also possible to address each of the nozzles, which are mounted essentially on a line that runs perpendicular to the course of the rails, individually so that preferably weed-specific herbicide can only be dispensed via the respectively addressed nozzle. In this way, the corresponding herbicide can be sprayed in the trackbed very precisely. This leads to a corresponding reduction of the total quantity of herbicide delivered and hence to a lower environmental impact and cost savings due to economies in herbicide quantities.

In a further advantageous exemplary embodiment of the modular system, those closure rail nozzles from the group of closure rail nozzles, which are closest to railway tracks located diagonally underneath them, are half-jet nozzles and the other closure rail nozzles are full-jet nozzles. In particular, the half-jet nozzles can be oriented so that the rails are not sprayed. In this way, the herbicide usage can be reduced further in an environmentally friendly way, and no grease films are formed on the rails so that the emergency braking characteristics of the spraying train are not adversely affected.

In a similar arrangement, corresponding to a further exemplary embodiment, the two groups of the embankment nozzles, which are closest to railway tracks located diagonally underneath them, are half-jet nozzles and the other embankment nozzles are full-jet nozzles. For the advantages of this arrangement the same applies as for the closure rail nozzles.

An additional advantageous exemplary embodiment of the modular system can provide that the nozzles of the nozzle rod are spoon nozzles. In so doing, the outlet of the spray jet is formed by a compressed air outlet positioned circularly around an outlet opening for the herbicide mixture. This counteracts a malformation of the spray jet at higher speeds of the spray train, so that even higher train speeds are possible without negatively affecting the effectiveness of the spray jet of the nozzle rod too greatly.

Another exemplary embodiment of the modular system can provide that the control and monitoring module and the herbicide and mixing module are embodied in a container design. The containers provided can thus be mounted neatly on the respective carrying wagons in a standardized manner.

An extended exemplary embodiment of the modular system can provide that a power module is in additionally present on a platform in a modular design and/or container design. The power module can be electrically connected to both the control and monitoring module and the herbicide mixing module. In addition, the power module can also be reversibly secured to the support element—i.e. the carrying wagon.

The power module can be positioned between the control and monitoring module and the herbicide and mixing module, and additionally act as an accessible platform. This is always advisable when the actual module for energy generation does not occupy the entire width of the carrying wagon. This platform can also be used as a collection, rescue and safety platform and/or as a launch and landing pad for the above-mentioned flying object.

In addition, in accordance with one exemplary embodiment of the modular system the carrying wagon can be a standard 80-foot carrying wagon. This can have either double axles or single end axles and a central axle—in each case at the end. The advantage of the double axles is a quieter driving behavior of the carrying wagon.

As an alternative and in accordance with a further exemplary embodiment of the modular system, the carrying wagon can consist of a plurality of carrying wagons coupled together—for example, 2, 3, or 4—, each of which is shorter than a standard 80-foot carrying wagon. This provides even greater flexibility with regard to the loading of the modules on rail vehicles.

A further advantageous exemplary embodiment of the modular system may provide that the nozzle rod is secured to the support element underneath the control and monitoring module. This means that the function of the nozzle rod is directly observable from the control and monitoring module. Alternatively or in addition, surveillance cameras and monitors can be used for monitoring the function of the nozzle rod.

Further preferred embodiments are:

1. A modular system for weed control for a rail vehicle, the modular system having
 a control unit configured
  to generate a first set of control signals for controlling valves and mixers in of a separate herbicide and mixing module for mixing a weed-specific herbicide mixture, and
  to generate a second set of control signals for controlling valves of a nozzle rod; and
 the herbicide and mixing module having
  a container for holding different herbicides, which are selectively fluidically connected to the valves and mixers in a selective fluidic connection,
  connection elements, via which electrical signal connections can be made to connection elements of the control unit, so that the first control signals generated in the control unit can be directed to the valves and mixers of the herbicide and mixing module, and a nozzle rod, which in each case is spatially independent of both the control unit and the herbicide and mixing module, having a first set of nozzles for spraying herbicides, and a fluid connection to a selection of the valves and mixers of the herbicide and mixing module, a camera module which generates a control signal in response to the detection of a weed, wherein the generation of the first set of control signals and the generation of the second set of control signals by the control signal can be controlled by means of the control unit, and wherein the camera module has a predefined distance to the nozzle rod, is spatially separated from each of the control unit, the herbicide and mixing module and the nozzle rod, and is arranged in front of the control unit, the herbicide and mixing module and the nozzle rod in a common direction of motion thereof.

wherein the camera module has a predefined distance from the control unit and is spatially separated from the control unit and the herbicide and mixing module in a common direction of motion of the control unit, the herbicide and mixing module and the nozzle rod.

2. The modular system in accordance with embodiment 1, wherein the control unit is part of a control and monitoring module, which together with the herbicide and mixing module and the nozzle rod can be reversibly individually secured to a support element.

3. The modular system in accordance with embodiment 2, wherein the support element is a carrying wagon for use on rails.

4. The modular system in accordance with one of the embodiments 1, 2 or 3, wherein the camera module is reversibly attached to a vehicle traveling ahead of the control unit.

5. The modular system in accordance with one of the embodiments 1, 2 or 3 or 4, wherein the camera module is attached to a drone.

6. The modular system in accordance with one of the embodiments 1, 2, 3, 4 or 5, wherein the camera module is mounted on a train which is traveling ahead of a train carrying the control unit and the nozzle rod.

7. The modular system in accordance with one of the embodiments 1, 2, 3, 4, 5 or 6, wherein the camera module is adapted to generate a weed-specific signal, and the control unit being adapted to receive the specific weed signal from the camera module and the control unit being adapted to generate weed-specific weed signals for controlling the valves and mixers during the production of the first set of control signals.

8. The modular system in accordance with one of the embodiments 1, 2, 3, 4, 5, 6 or 7, wherein the nozzle rod has a group of closure rail nozzles and two groups of embankment nozzles.

9. The modular system in accordance with embodiment 8, in which those closure rail nozzles from the group of closure rail nozzles, which are closest to railway tracks located diagonally underneath them, are half-jet nozzles and the other closure rail nozzles are full-jet nozzles.

10. The modular system in accordance with embodiment 8 or 9, in which those embankment nozzles from the two groups of embankment nozzles, which are closest to the railway tracks located diagonally underneath them, are half-jet nozzles and the other closure rail nozzles are full-jet nozzles.

11. The modular system in accordance with one of the preceding claims 1, 2, 3, 4, 5, 6, 7, 8, 9 or 10, in which nozzles of the nozzle rod are spoon nozzles, and wherein the outlet of the spray jet is formed by a compressed air outlet positioned circularly around an outlet opening for the herbicide mixture.

12. The modular system in accordance with one of the embodiments 1, 2, 3, 4, 5, 6, 7, 8, 9, 10 or 11, wherein the control and monitoring module and the herbicide and mixing module are designed in a container construction.

13. The modular system in accordance with one of the embodiments 1, 2, 3, 4, 5, 6, 7, 8, 9, 10, 11 or 12, having a power module on a platform in a module design and/or container design, the power module being electrically connectable to the control and monitoring module and the herbicide mixing module, and wherein the power module can be reversibly secured to the carrier element.

14. The modular system in accordance with one of the embodiments 3, 4, 5, 6, 7, 8, 9, 10, 11, 10, 12 or 13, wherein the carrying wagon is a standard 80-foot carrying wagon.

15. The modular system in accordance with one of the embodiments 3, 4, 5, 6, 7, 8, 9, 10, 11, 12 or 13, in which the carrying wagon consists of a plurality of carrying wagons coupled together.

16. The modular system in accordance with one of the embodiments 1, 2, 3, 4, 5, 6, 7, 8, 9, 10, 11, 12, 13, 14 or 15, wherein the nozzle rod is attached to the support element below the control and mixing module.

17. A spraying train for weed control on railway tracks, having the modular system for weed control in accordance with one of the embodiments 1 to 16 on one or more carrying wagons, and a second wagon for the reversible mounting of the camera module, the second wagon being arranged in front of the one or more carrying wagons in a direction of travel.

18. A method for controlling weeds in a trackbed, said method comprising reversibly securing a control unit in a control and monitoring module to a carrying wagon, reversibly securing a herbicide and mixing module to the carrying wagon, reversibly securing a nozzle rod to the carrying wagon, the nozzle rod being spatially independent of both the control and monitoring module and the herbicide and mixing module, producing a fluidic connection between the herbicide and mixing module and the nozzle rod, generating a weed signal using a camera module, which is spaced in front of the carrying wagon in a travel direction of the carrying wagon, manipulating a first set of control signals for controlling valves and mixers in the herbicide and mixing module for mixing a weed-specific herbicide mixture by means of the control unit as a function of the weed signal of the camera module, manipulating a second set of control signals for controlling valves of a nozzle rod by means of the control unit as a function of the weed signal of the camera module, and selectively spraying the weed-specific herbicide mixture onto rail tracks through nozzles in the nozzle rod, the herbicide and mixing module having:

a multiplicity of containers for holding different herbicides, which are selectively fluidically connected to the valves and mixers in a selective fluids connection, connection elements, via which electrical signal connections are made to connection elements of the control unit, so that the first control signals generated in the control unit are directed to the valves and mixers of the herbicide and mixing module, and omitting the rail heads in the selective spraying of the weed-specific herbicide mixture on a rail track.

It is noted that embodiments of the invention have been described with reference to different objects of the invention. In particular, some embodiments of the invention can be described with device claims and other embodiments of the invention with method claims. It will be clear immediately to the person skilled in the art in reading this description, however, that unless explicitly stated otherwise, in addition to a combination of features which belong to one type of an object of the invention, any desired combination of features which belong to different categories of objects of the invention is possible.

Further advantages and features of the present invention are derived from the following exemplary description of preferred embodiments. The individual figures of the drawings of this application should be regarded merely as schematic, exemplary and as not drawn to scale.

In the following text, preferred exemplary embodiments of the invention will be described on the basis of examples and with reference to FIGS. 1-8.

It should be noted that features or components of different embodiments that are identical or at least functionally equivalent to the corresponding features or components of the embodiment are either labeled with the same reference numerals or with a different reference numeral, which differs only in its first digit from the reference numeral of a (functionally) corresponding feature or a (functionally) corresponding component. In order to avoid unnecessary repetitions, features or components already discussed on the basis of a previously described embodiment are no longer explained in detail later.

It should also be noted that the embodiments described below only represent a limited selection of possible design variants of the invention. In particular, it is possible to combine the features of individual embodiments together in an appropriate manner, so that along with the design variants explicitly shown here a plurality of different embodiments should also be considered as manifestly disclosed for the person skilled in the art.

FIG. 1 shows the modular system 100 for weed control for a rail vehicle in a schematic drawing.

The modular system has a control unit 104 which is contained in a control and monitoring module 102, a herbicide and mixing module 106, a nozzle rod 108, and a camera module 110. The control unit 104 is configured for generating a first set of control signals for controlling valves and mixers 112 in the separate herbicide and mixing module 106 for mixing a herbicide mixture, and for generating a second set of control signals for controlling valves of a nozzle rod 108.

The herbicide and mixing module 106 has containers 114 for holding different herbicides, which are selectively fluidically connected to the valves and mixers 112 in a selective fluidic connection, and connecting elements—for example plug connectors on an external wall—via which electrical signal connections to connector elements—for example plug connectors on an external wall—of the control unit 104 can be made, so that the first control signals generated by the control unit 104 in the control and monitoring module 102 can be directed to the valves and mixers 112 of the herbicide and mixing module 106.

The nozzle rod 108, which in each case is spatially independent of both the control and monitoring module 102 and the herbicide and mixing module 106, has a first set of nozzles for spraying herbicides and at least one fluidic connection to a selection of the valves and mixers 112 of the herbicide and mixing module 106.

The camera module 110, which generates a weed signal in response to detecting a weed, can be secured to a wagon 116 traveling ahead of a carrying wagon 118, which carries the control unit 104 in the control and 31 monitoring module 102, the herbicide and mixing module 106 and the nozzle rod 108. The camera module 110 can have a plurality of individual cameras, which are aimed at the trackbed in front of them (not shown) in the direction of travel 120.

In this case, the generation of the first set of control signals and the generation of the second set of control signals by the weed signal can be controlled by means of the control unit. The camera module 110 has a predefined distance from the nozzle assembly 108. The camera module 110 is additionally spatially separated from the control and monitoring module 102 and the herbicide and mixing module 106 in a common direction of movement of the control and monitoring module 102, the herbicide and mixing module 106 and the nozzle rod 108. This means that is not mounted on the carrying wagon 118 that carries the control unit 104 and the nozzle rod 108. Instead, it is reversibly secured at a position in the direction of travel 120, so that sufficient time is available for the image processing of the camera module 110 and the provision of the corresponding herbicide mixtures at the nozzle rod 108, even at higher speeds.

The wagon 116 traveling in front can be a tank wagon, for example, from which mixing water for the herbicide and mixing module 106 can be supplied via a hose connection. However, one or more other wagons or a locomotive can also be arranged between the nozzle rod 108 and the camera module 110. Alternatively, the camera module 110 can also be secured to a train traveling at a known distance ahead, or to a drone flying ahead of it.

A plurality of supply lines 124 are in fluid communication with the plurality of nozzles of the nozzle rod 108. A plurality of valves 122 are configured to control flow of the fluid in the plurality of supply lines 124, and a plurality of control lines 126 are configured to operate the plurality of valves 122.

Figure 2:
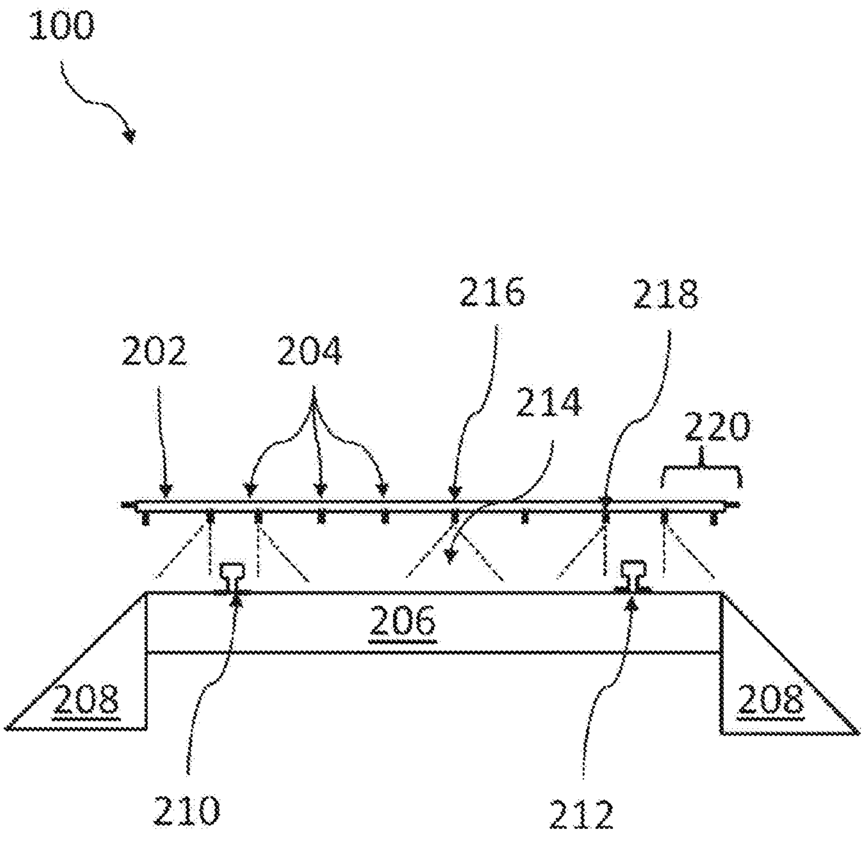
FIG. 2 shows a schematic illustration of a nozzle rod, according to some embodiments.

FIG. 2 shows a nozzle rod 202 with a plurality of nozzles 204 over a trackbed 206 and lateral embankment 208. In addition, FIG. 2 shows the railway track sections, 210, 212 on the trackbed 206. Using the example of the nozzle 216, by means of broken lines it is shown, for example, how a full-jet nozzle can spray a herbicide mixture onto the track bed 206. Using the example of the right outer nozzle 218, the function of a half jet nozzle is illustrated. Here the right-hand region of the nozzle jet 212 is limited, so that the rail 212 cannot be sprayed.

Those nozzles located outside the respective railway tracks 210, 212—shown, for example, by the nozzles 220—can be used for spraying the respective embankment (here embankment 208) and also a path that runs parallel to the embankment 208. The nozzle of the nozzles 220 which is located closest to the rail 212 is again implemented as a half-jet nozzle so that the rail 212 is not sprayed. The same applies to the left-hand side of the nozzle rod 202.

Figure 3:
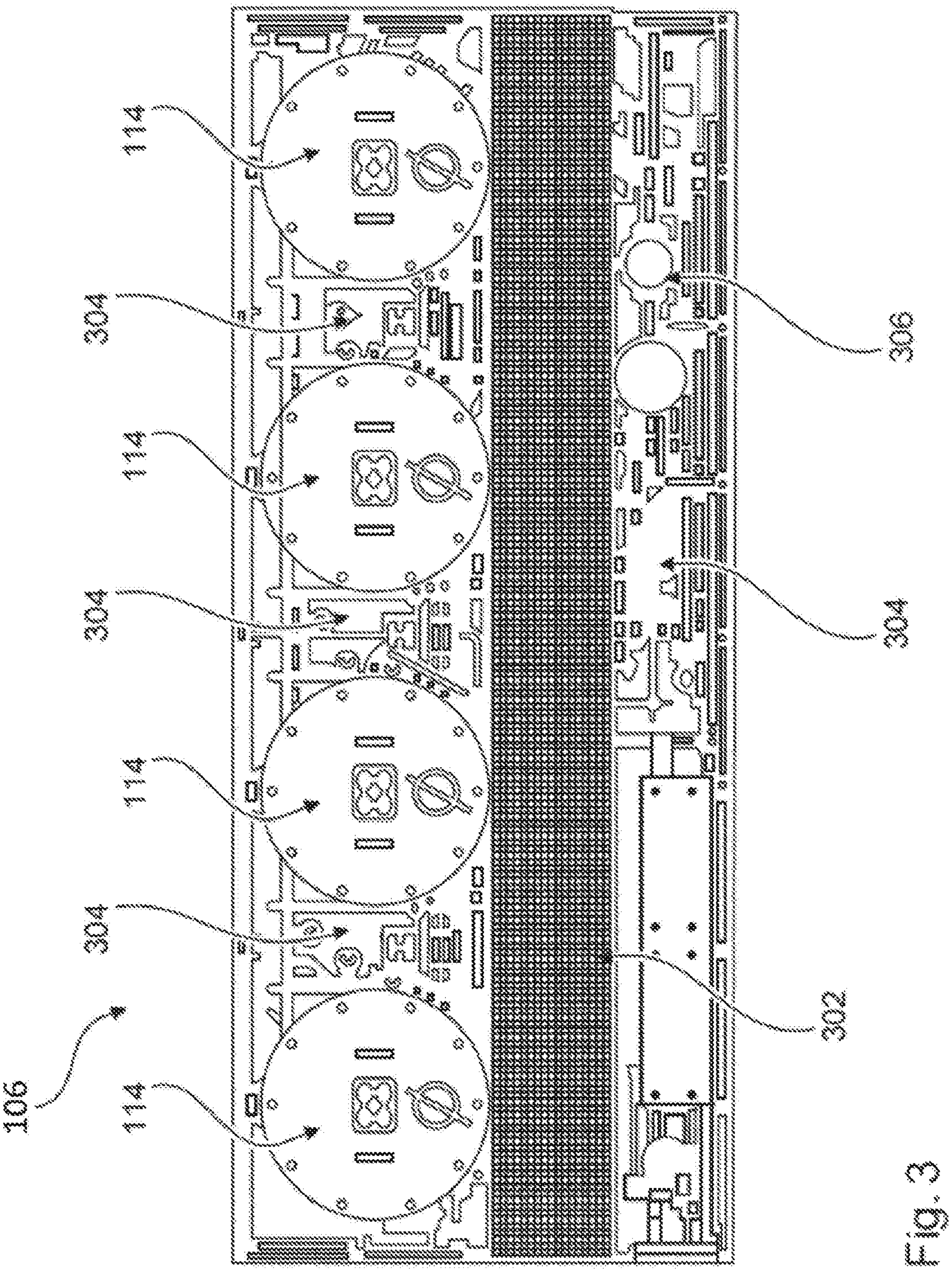
FIG. 3 represents an exemplary embodiment of the herbicide and mixing module in a top view with the roof removed, according to some embodiments.

FIG. 3 represents an exemplary embodiment of the herbicide and mixing module 106 in a plan view with the roof removed. The plurality of containers 114 for holding different (or even identical) herbicides is clearly visible, four of which are shown here, for example. A gangway 302 connects a left-hand entrance side to a right-hand entrance side of the herbicide and mixing module 106. A plurality of pipes, valves and mixers 304 and pumps 306 (as an example) and other control devices (not shown in detail) allows a mixture of different herbicide mixtures, for example, weed-specific herbicide mixtures. The herbicide and mixing module 106 is typically located in a housing in the form of a standard 20-foot freight container in accordance with ISO 668:2013-08.

Figure 4:
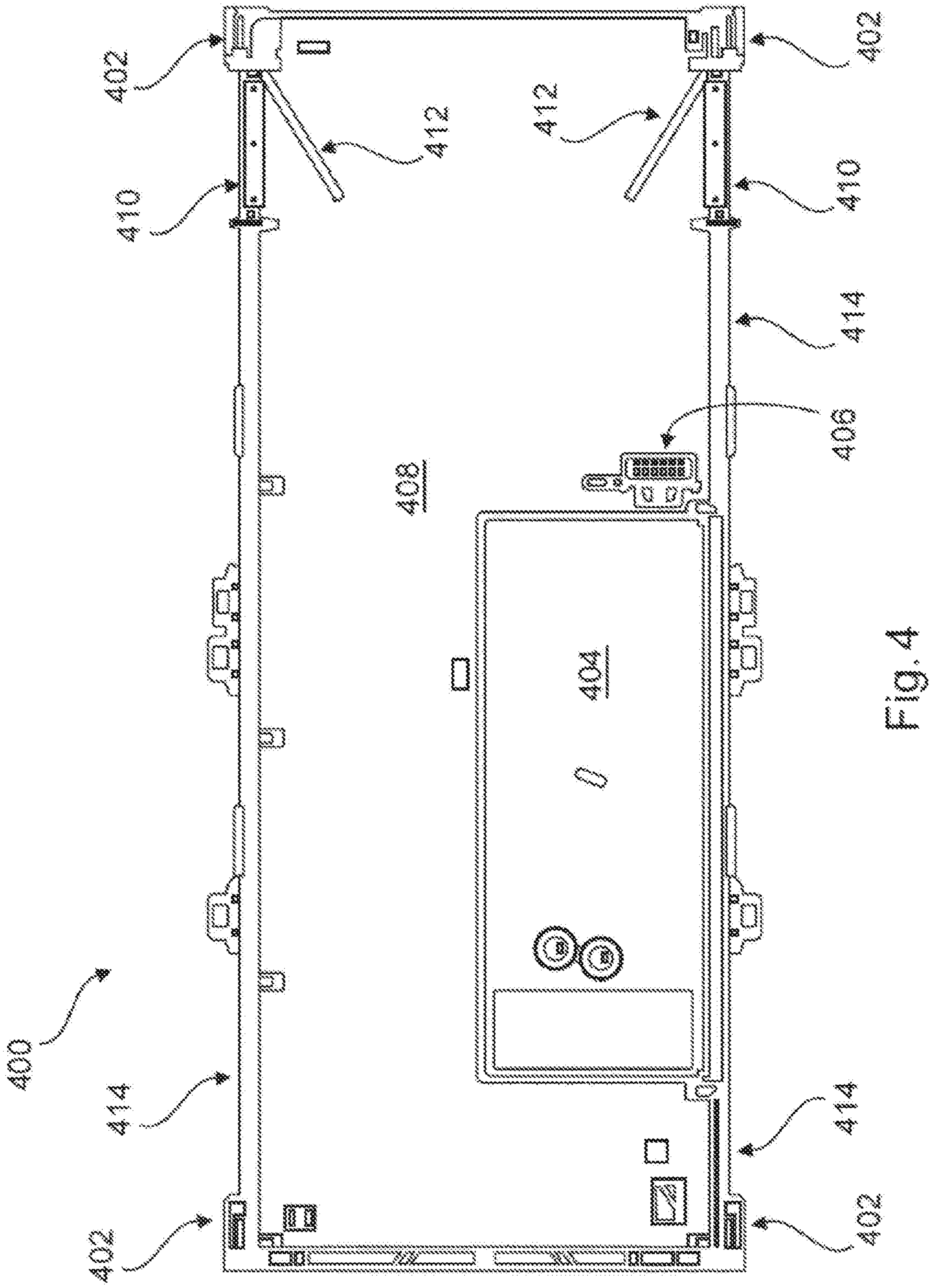
FIG. 4 shows an exemplary embodiment of a plan view of the power module, according to some embodiments.

FIG. 4 shows an exemplary embodiment of a plan view of the power module 400. The power module 400 consists of an actual power generation block 404, in which a combustion engine can generate electricity by means of a generator. Via an operator terminal 406 the power generation block 404 can be controlled externally. A tank for the fuel can be filled from the top.

The power generation block 404 is mounted on a platform, which can occupy the base area of a standard 20-foot freight container, for example. Fixing points 402 for securing to a carrying wagon can also be seen on this power module 400. A railing 414 to the side protects the operating personnel from falling off the platform 408. The platform 408 can be reached via a ladder 410. This platform can be blocked off by means of swing doors 412. On the respective left- and right-hand side of the power module 400 there is no need to provide a railing. Instead, via these ends of the power module 400 the other modules—the control and monitoring module and the herbicide and mixing module—can be reached.

Figure 5:
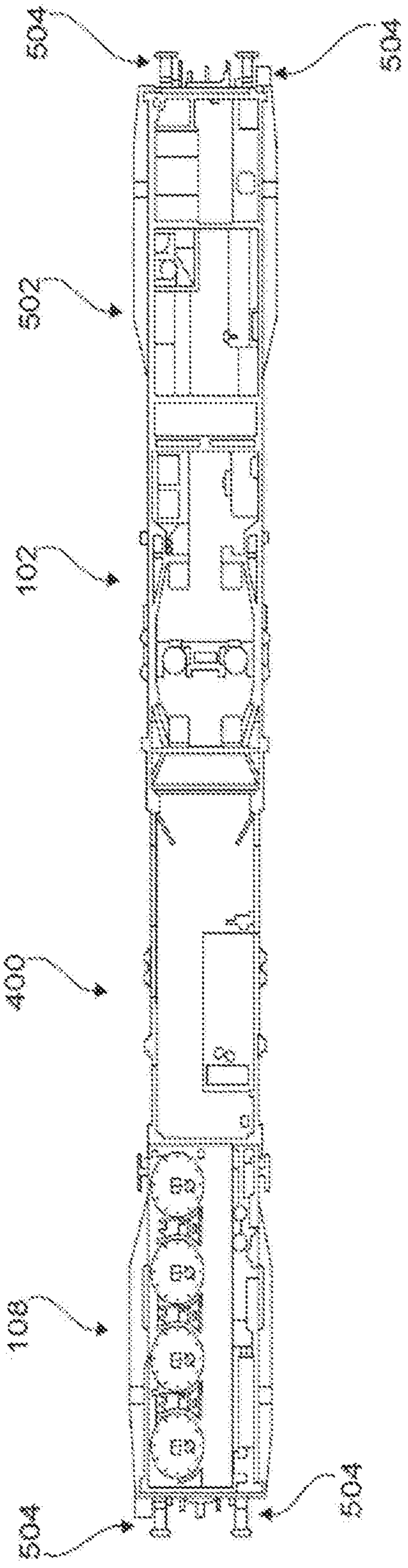
FIG. 5 illustrates the individual modules connected together, according to some embodiments.

FIG. 5 illustrates a plurality of modules connected together. The herbicide and mixing module 106 is located on the far left, followed by the power module 400, the control and monitoring module 102 with the control unit 104 (not shown), and an additional lounge module 502. From the buffers 504 it is evident that all modules are shown next to each other on a carrying wagon.

Figure 6:
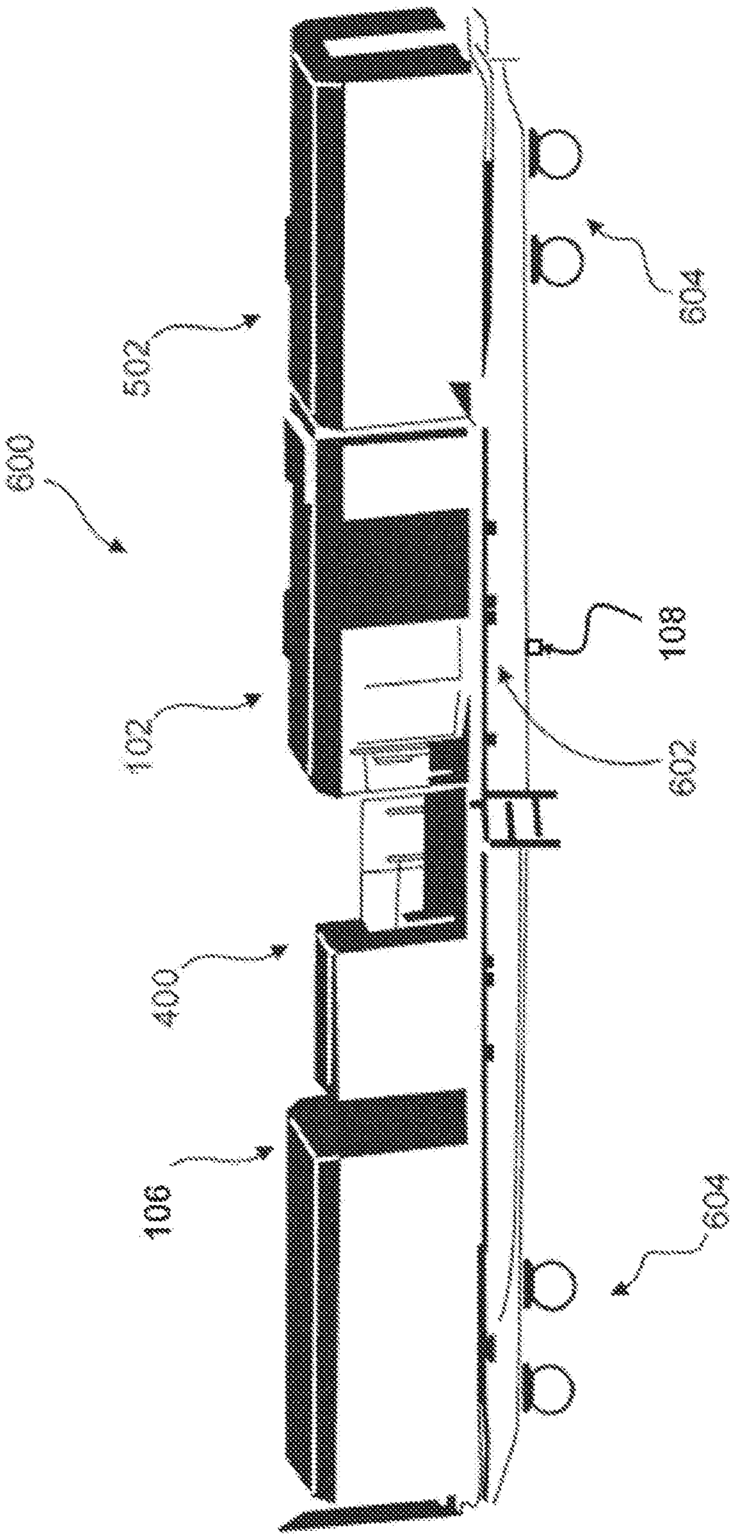
FIG. 6 shows an example of a perspective view of the individual modules in context, according to some embodiments.

FIG. 6 shows an example of a perspective view 600 of the plurality of modules: the herbicide and mixing module 106, the power module 400, the control and monitoring module 102, and the lounge module 502. All modules are shown on a carrying wagon 602 with two double-axle hubs 604. The sequence of the individual modules illustrated has proved to be advantageous. The lounge module 502 is located furthest away from the herbicide and mixing module 106, so that in the event of a malfunction of the herbicide and mixing module 106 (for example, uncontrolled escape of herbicide) the personnel on board is protected by the distance alone. In addition, a schematic representation of the nozzle rod 108 is evident below the control and monitoring module 102 on the carrying wagon.

The power module 400 is located between the herbicide and mixing module 106 and the control and monitoring module 102 and can readily supply power to both modules. The platform of the energy module 400 is easily accessible both from the herbicide and mixing module 106 and the control and monitoring module 104.

Figure 7:
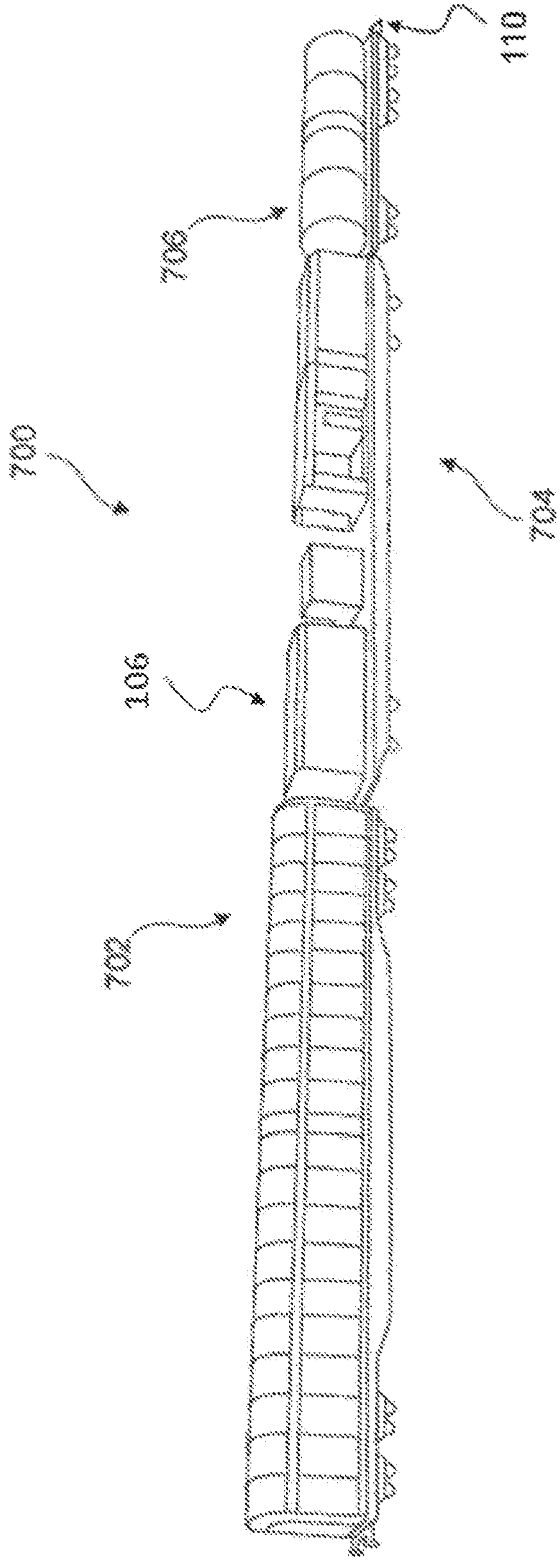
FIG. 7 shows an example of a perspective view of a train with the modular system for weed control, according to some embodiments.

FIG. 7 shows an example of a perspective view of a train 700 consisting of a storage wagon 702, the carrying wagon 704 with the entire modular system for weed control and a tank wagon 706, with which water can be transported which can be supplied to the herbicide and mixing module 106 via hoses. In this drawing, the camera module 110 is shown in the front region of the tank wagon 706. The power module 400 can be seen with its platform.

The storage wagon 702 can be used for the storage and transport of various supplies for the train 700; in particular, in this way various herbicides can be held directly in stock in large quantities. This means that the stock of herbicides is not limited to the capacity of the containers in the herbicide and mixing module 106. A locomotive can be provided at the beginning or at the end of the train 700. The orientation—i.e., the outlet of the herbicides from the nozzle rod—should be adjusted according to the direction of the train. No rearrangement of the modules of the modular system for weed control for a different direction of travel is necessary.

Figure 8:
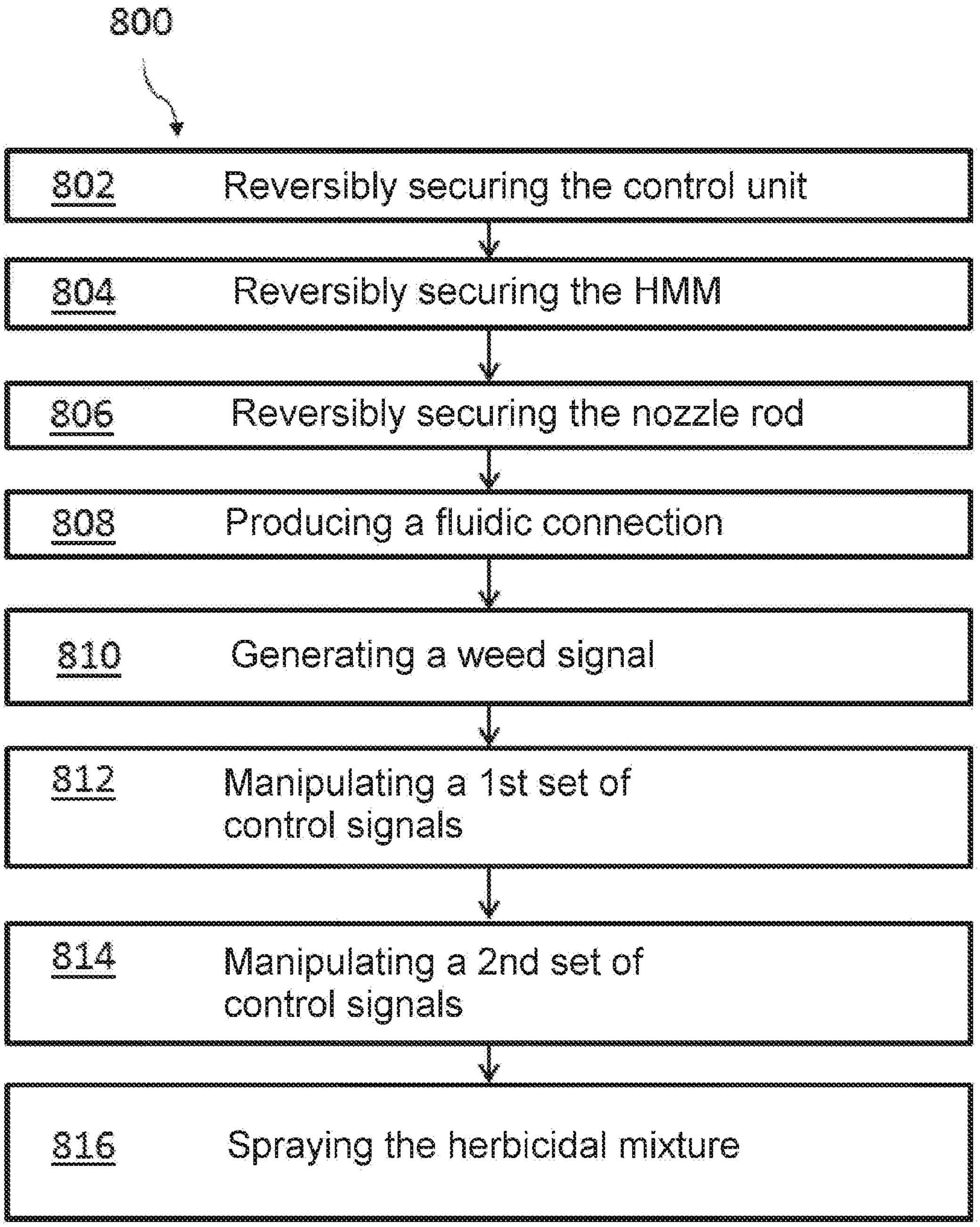
FIG. 8 illustrates the method for controlling weeds in a trackbed using the modular system, according to some embodiments.

FIG. 8 illustrates the method 800 for controlling weeds in a trackbed. The method 800 comprises reversibly securing 802 a control unit in a control and monitoring module to a carrying wagon, reversibly securing 804 a herbicide and mixing module (HMM) to the carrying wagon, and reversibly securing 806 a nozzle rod to the carrying wagon. The nozzle rod is spatially independent of both the control and monitoring module and the herbicide and mixing module.

Figure 9:
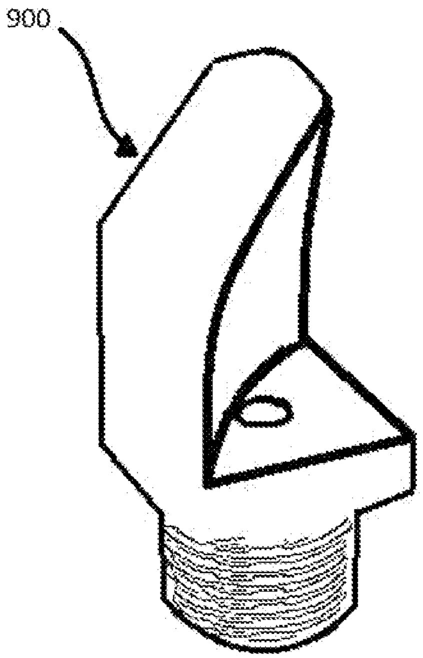
FIG. 9 shows an example of a spoon nozzle according to some embodiments.

FIG. 9 shows an example of a spoon nozzle 900.

Figure 10:
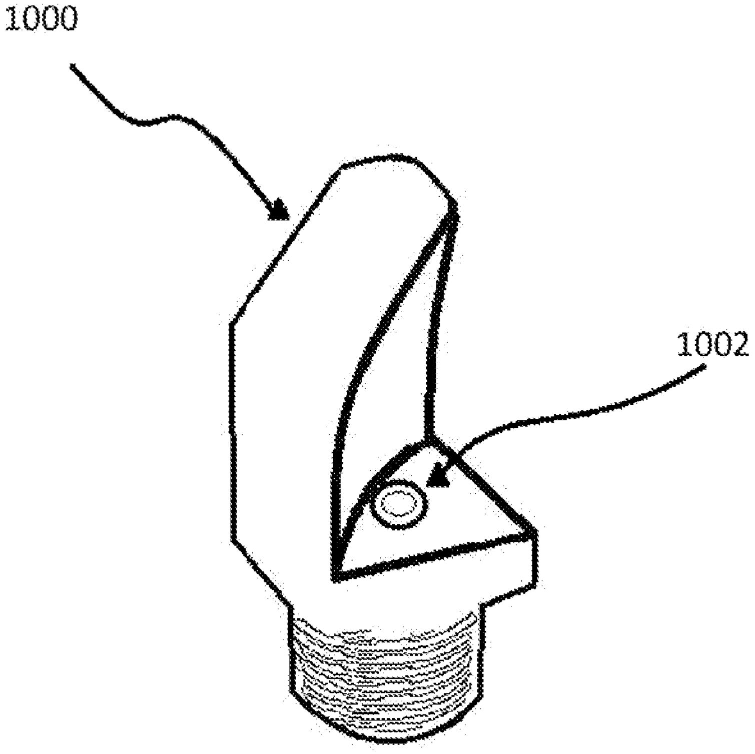
FIG. 10 shows an example of a spoon nozzle according to some embodiments.

FIG. 10 shows an example of a spoon nozzle 1000 having a compressed air outlet 1002 positioned circularly around an outlet opening.

In addition, the method 800 comprises producing a fluidic connection 808 between the herbicide and mixing module and the nozzle rod and generating 810 a weed signal using a camera module. The camera module is arranged at a distance in front of the carrying wagon in a direction of travel of the carrying wagon.

In addition, the method 800 comprises manipulating 812 a first set of control signals for controlling valves and mixers in the herbicide and mixing module for mixing a herbicidal mixture by means of the control unit as a function of the weed signal of the camera module 814 and manipulating a second set of control signals for controlling valves of a nozzle rod by means of the control unit depending on the weed signal of the camera module.

Based on this, the method 800 comprises a selective spraying 816 of the herbicide mixture onto rail tracks through nozzles in the nozzle rod.

The description of the various embodiments of the present invention was used for illustrative purposes. They are not intended to limit the scope of the inventive idea. The person skilled in the art will be able to devise further modifications and variations without departing from the core of the present invention.

The invention claimed is:

1. A nozzle rod, comprising:

a plurality of nozzles configured to spray a fluid;

a plurality of supply lines in fluid communication with the plurality of nozzles; and a plurality of control lines configured to control spray of the fluid from the plurality of nozzles, wherein the nozzle rod is configured for attachment to a support element, and attachment of the nozzle rod to the support element aligns the plurality of nozzles with a railway track bed, a railway rail, or a railway track embankment, or any combination thereof, wherein the nozzle rod comprises a group of closure rail nozzles and a group of embankment nozzles, the closure rail nozzles are configured for alignment above the railway rail, or between adjacent railway rails, or both to spray the fluid on the railway track bed between adjacent railway rails, and the embankment nozzles are configured for alignment above the railway track embankment, beside the railway track embankment, or both to spray the fluid on the railway track bed, wherein the group of closure rail nozzles comprises first and second subgroups of closure rail nozzles, the first subgroup comprises closure rail nozzles that are closest to railway tracks located diagonally underneath them, the closure rail nozzles of the first subgroup of closure rail nozzles are half-jet nozzles, and the closure rail nozzles of the second subgroup are full-jet nozzles.

2. The nozzle rod of claim 1, wherein the plurality of nozzles comprise a spoon nozzle.

3. The nozzle rod of claim 2, wherein a spray jet is formed by a compressed air outlet positioned circularly around an outlet opening in the spoon nozzle.

4. The nozzle rod of claim 1, further comprising a plurality of valves, the plurality of valves configured to control flow of the fluid in the plurality of supply lines, and the plurality of control lines configured to operate the plurality of valves.

5. The nozzle of claim 1, wherein the fluid comprises an herbicide mixture, water, or compressed air, or any combination thereof.

6. The nozzle rod of claim 1, wherein the group of embankment nozzles comprises first and second subgroups of embankment nozzles, the first subgroup comprises embankment nozzles that are closest to the railway tracks located diagonally underneath them, the embankment nozzles of the first subgroup of embankment nozzles are half-jet nozzles, and the embankment nozzles of the second subgroup are full-jet nozzles.

7. The nozzle rod of claim 1, wherein the support element is a train car or is attached to a train car.

8. A modular system for weed control comprising:

the nozzle rod of claim 1; and an herbicide mixture module configured for fluid communication with a supply line of the plurality of supply lines, wherein the nozzle rod and the herbicide mixture module are configured to receive signals from a control module, and the signals are generated by a camera module in response to detection of a weed.

9. A train for weed control on railway tracks, the train comprising:

one or more carrying wagons; and the nozzle rod of claim 1 attached to the one or more carrying wagons, wherein the one or more carrying wagons are configured to receive one or more of an herbicide mixture module, a control module, and a camera module.

10. A method of controlling weeds comprising spraying the fluid on the railway track bed, the railway rail, or the railway track embankment, or any combination thereof through the plurality of nozzles of the nozzle rod of claim 1, wherein the fluid comprises an herbicide mixture.

* * * * *